(12) United States Patent
Bingell et al.

(10) Patent No.: US 9,424,552 B2
(45) Date of Patent: Aug. 23, 2016

(54) MANAGING WEBSITE REGISTRATIONS

(75) Inventors: Nicholas D. Bingell, Raleigh, NC (US); Erich P. Hoppe, Apex, NC (US); Andrew J. Ivory, Wake Forest, NC (US); David M. Stecher, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 899 days.

(21) Appl. No.: 13/567,556

(22) Filed: Aug. 6, 2012

(65) Prior Publication Data

US 2014/0040456 A1 Feb. 6, 2014

(51) Int. Cl.
G06F 15/16 (2006.01)
G06Q 10/10 (2012.01)
H04L 29/08 (2006.01)
G06F 12/00 (2006.01)

(52) U.S. Cl.
CPC .......... *G06Q 10/10* (2013.01); *H04L 29/08072* (2013.01)

(58) Field of Classification Search
CPC ................ H04L 9/32; G06F 15/173
USPC ................. 709/203, 223–229, 250
See application file for complete search history.

(56) References Cited

U.S. PATENT DOCUMENTS

| | | | | |
|---|---|---|---|---|
| 7,451,113 B1* | 11/2008 | Kasower | | 705/38 |
| 8,639,629 B1* | 1/2014 | Hoffman | | 705/67 |
| 2002/0035556 A1* | 3/2002 | Shah et al. | | 707/1 |
| 2008/0031447 A1* | 2/2008 | Geshwind et al. | | 380/46 |
| 2010/0017889 A1* | 1/2010 | Newstadt et al. | | 726/28 |
| 2010/0299431 A1 | 11/2010 | Vanderhook et al. | | |
| 2011/0047606 A1* | 2/2011 | Blomquist et al. | | 726/7 |

FOREIGN PATENT DOCUMENTS

WO 2011071326 A2 6/2011

OTHER PUBLICATIONS

"Method and System for Managing Personal Media Publishing Across Multiple Web Sites", published Jun. 21, 2010, IP.com, IP.com No. IPCOM000196933D, published on the world wide web at http://ip.com/IPCOM/000196933.
"The Method to Find Unused Files on the Web Server", published May 1, 2000, IP.com, IP.com No. IPCOM000013568D, published on the world wide web at: http://ip.com/IPCOM/000013568.
"How to track down old bank accounts", published Feb. 8, 2011, ehow.com, published on the world wide web at: http://www.ehow.com/how_6388638_track-down-old-bank-accounts.html.
"Peek the owner of any email address", published Jun. 30, 2011, Peekyou.com, published on the world wide web at: https://web.archive.org/web/20110630101555/http://www.peekyou.com/email.
"What's yoName", Yoname.com, published 2007, published on the world wide web at: http://www.yoname.com/webSearch.aspx.

* cited by examiner

*Primary Examiner* — Zarni Maung
(74) *Attorney, Agent, or Firm* — Paul S. Drake

(57) ABSTRACT

A method, system or computer usable program product for removing underutilized website account registrations including identifying a registration of a website account by a user on a data processing system, tracking access to the website account by the user, responsive to determining an underutilization of the website account, removing the registration of the website account.

20 Claims, 7 Drawing Sheets

FIG. 8

| | | 830 | 840 | 850 | 860 | 870 |
|---|---|---|---|---|---|---|
| 810 | | | Recommend for Removal: | Last Visited | Freq. | |
| | | ☑ | FinancialSite2.com | 2/1/12 | 1 | |
| | | ☑ | SocialSite3.com | 1/15/12 | 2 | |
| 820 | | | All Other Sites: | | | |
| | | ☐ | FinancialSite1.com | 7/1/12 | 24 | |
| | | ☐ | FinancialSite3.com | 6/15/12 | 12 | |
| | | ☐ | SocialSite1.com | 7/10/12 | 200 | |
| | | ☐ | SocialSite2.com | 7/5/12 | 80 | |
| | | ☐ | TestSite1.com | 4/12/12 | 45 | |

880 — Remove

800

MANAGING WEBSITE REGISTRATIONS

BACKGROUND

1. Technical Field

The present invention relates generally to managing website registrations, and in particular, to a computer implemented method for monitoring and removing underutilized registrations of website accounts.

2. Description of Related Art

A user browsing the internet often encounters a website which requires the user to register an account with that website. This registration may allow the user to obtain additional services, access to information, or other benefits of such registration. Usually such registration requires a userid (user identifier), a password and an email address. The userid may be assigned by the website or may be selected by the user. The userid typically needs to be unique to that website, so the user may need to try several userids before generating one that is unique.

The password may be selected by the user, although different websites may have different requirements for password strength for security purposes. Sometimes the website may initially specify a password in an email to the user. The user then uses that password to initially login to the website and then specifies a new password meeting the password requirements of that website. As a result, the email address is verified for that user. Other methods of verifying email addresses include sending an email with a link for the user to click which sends a signal to the website. The email address is provided by the user to the website for several purposes. As described above, it may be used to verify the user. The website may also use the email address for providing emails relating to the website such as billing information or informational purposes. The email address may also be used by the website as a unique identifier of the user. In addition, the user website may be used to reset the password of the user should the user forget the password or the userid for that website.

Over a period of time, the user may register with many different websites, many of which have different userids, passwords, and email addresses for that user. As a result, users have difficulty remembering all this information for each website. Some browser providers and other software providers now provide a password vault for storing this information securely on the user's system.

SUMMARY

The illustrative embodiments provide a method, system, and computer usable program product for removing underutilized website account registrations including identifying a registration of a website account by a user on a data processing system, tracking access to the website account by the user, responsive to determining an underutilization of the website account, removing the registration of the website account.

BRIEF DESCRIPTION OF THE SEVERAL VIEWS OF THE DRAWINGS

The novel features believed characteristic of the invention are set forth in the appended claims. The invention itself, further objectives and advantages thereof, as well as a preferred mode of use, will best be understood by reference to the following detailed description of illustrative embodiments when read in conjunction with the accompanying drawings, wherein:

FIG. 8 is a diagram of a graphical user interface for removing website registrations.

DETAILED DESCRIPTION

Steps may be taken to managing website registrations, and in particular, to monitoring and removing underutilized website registrations in accordance with a policy for the website. The policy for a website may be established by default or by querying a user for user preferences. A user may also be queried before a website is removed. These steps may be taken as will be explained with reference to the various embodiments below.

Figure 1:
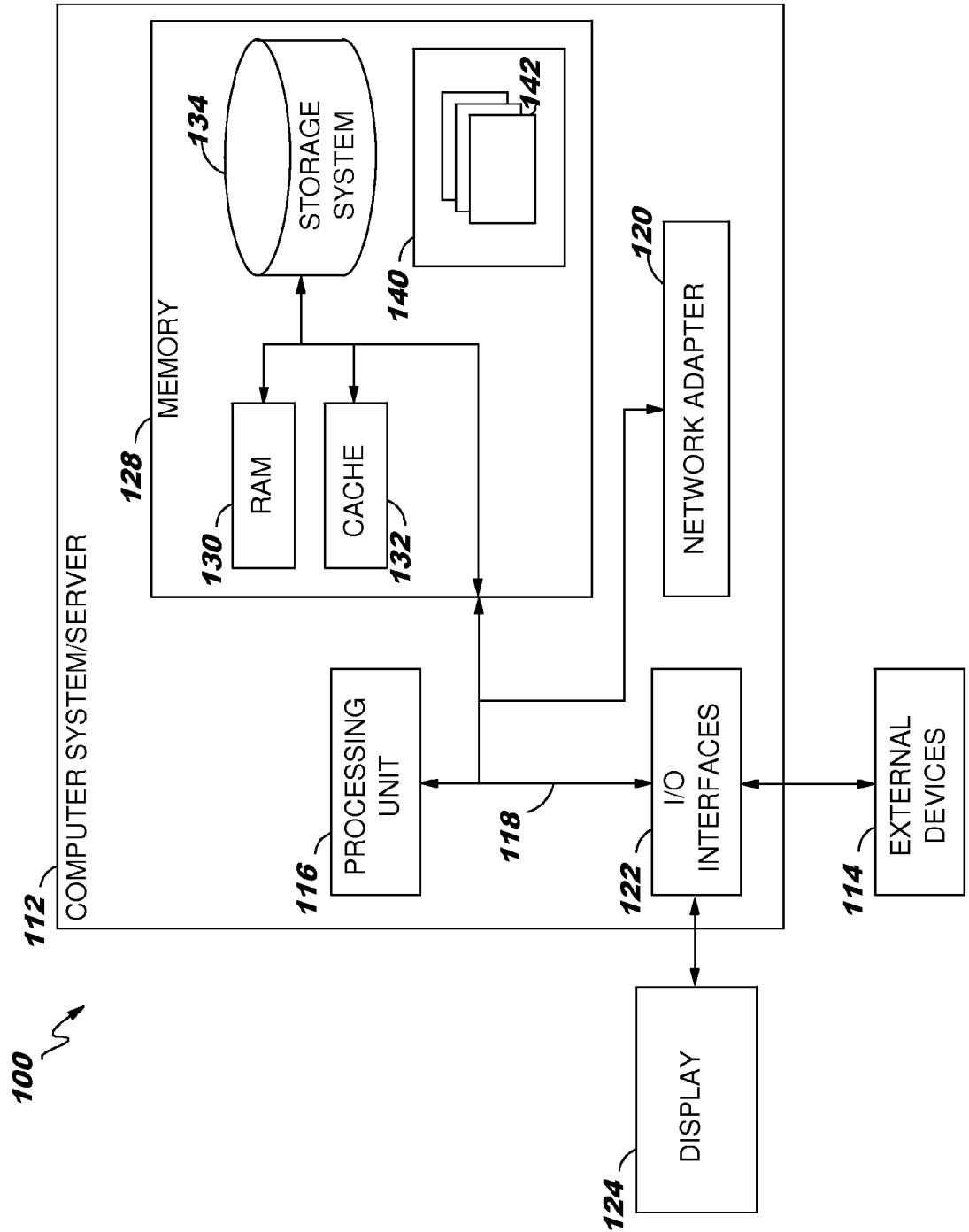
FIG. 1 is a block diagram of a data processing system in which various embodiments may be implemented.

FIG. 1 is a block diagram of a data processing system in which various embodiments may be implemented. Data processing system 100 is only one example of a suitable data processing system and is not intended to suggest any limitation as to the scope of use or functionality of embodiments of the invention described herein. Regardless, data processing system 100 is capable of being implemented and/or performing any of the functionality set forth herein.

In data processing system 100 there is a computer system/server 112, which is operational with numerous other general purpose or special purpose computing system environments, peripherals, or configurations. Examples of well-known computing systems, environments, and/or configurations that may be suitable for use with computer system/server 112 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 112 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 112 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 112 in data processing system 100 is shown in the form of a general-purpose computing device. The components of computer system/server 112 may include, but are not limited to, one or more processors or processing units 116, a system memory 128, and a bus 118 that couples various system components including system memory 128 to processor 116.

Bus 118 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 112 typically includes a variety of computer system readable media. Such media may be any available media that is accessible by computer system/server 112, and it includes both volatile and non-volatile media, removable and non-removable media.

System memory 128 can include computer system readable media in the form of volatile memory, such as random access memory (RAM) 130 and/or cache memory 132. Computer system/server 112 may further include other removable/non-removable, volatile/non-volatile computer system storage media. By way of example only, storage system 134 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 118 by one or more data media interfaces. Memory 128 may include at least one program product having a set (e.g., at least one) of program modules that are configured to carry out the functions of embodiments of the invention. Memory 128 may also include data that will be processed by a program product.

Program/utility 140, having a set (at least one) of program modules 142, may be stored in memory 128 by way of example, and not limitation, as well as an operating system, one or more application programs, other program modules, and program data. Each of the operating system, one or more application programs, other program modules, and program data or some combination thereof, may include an implementation of a networking environment. Program modules 142 generally carry out the functions and/or methodologies of embodiments of the invention. For example, a program module may be software for managing website registrations.

Computer system/server 112 may also communicate with one or more external devices 114 such as a keyboard, a pointing device, a display 124, etc.; one or more devices that enable a user to interact with computer system/server 112; and/or any devices (e.g., network card, modem, etc.) that enable computer system/server 112 to communicate with one or more other computing devices. Such communication can occur via I/O interfaces 122 through wired connections or wireless connections. Still yet, computer system/server 112 can communicate with one or more networks such as a local area network (LAN), a general wide area network (WAN), and/or a public network (e.g., the Internet) via network adapter 120. As depicted, network adapter 120 communicates with the other components of computer system/server 112 via bus 118. It should be understood that although not shown, other hardware and/or software components could be used in conjunction with computer system/server 112. Examples, include, but are not limited to: microcode, device drivers, redundant processing units, external disk drive arrays, RAID systems, tape drives, and data archival storage systems, etc.

Figure 2:
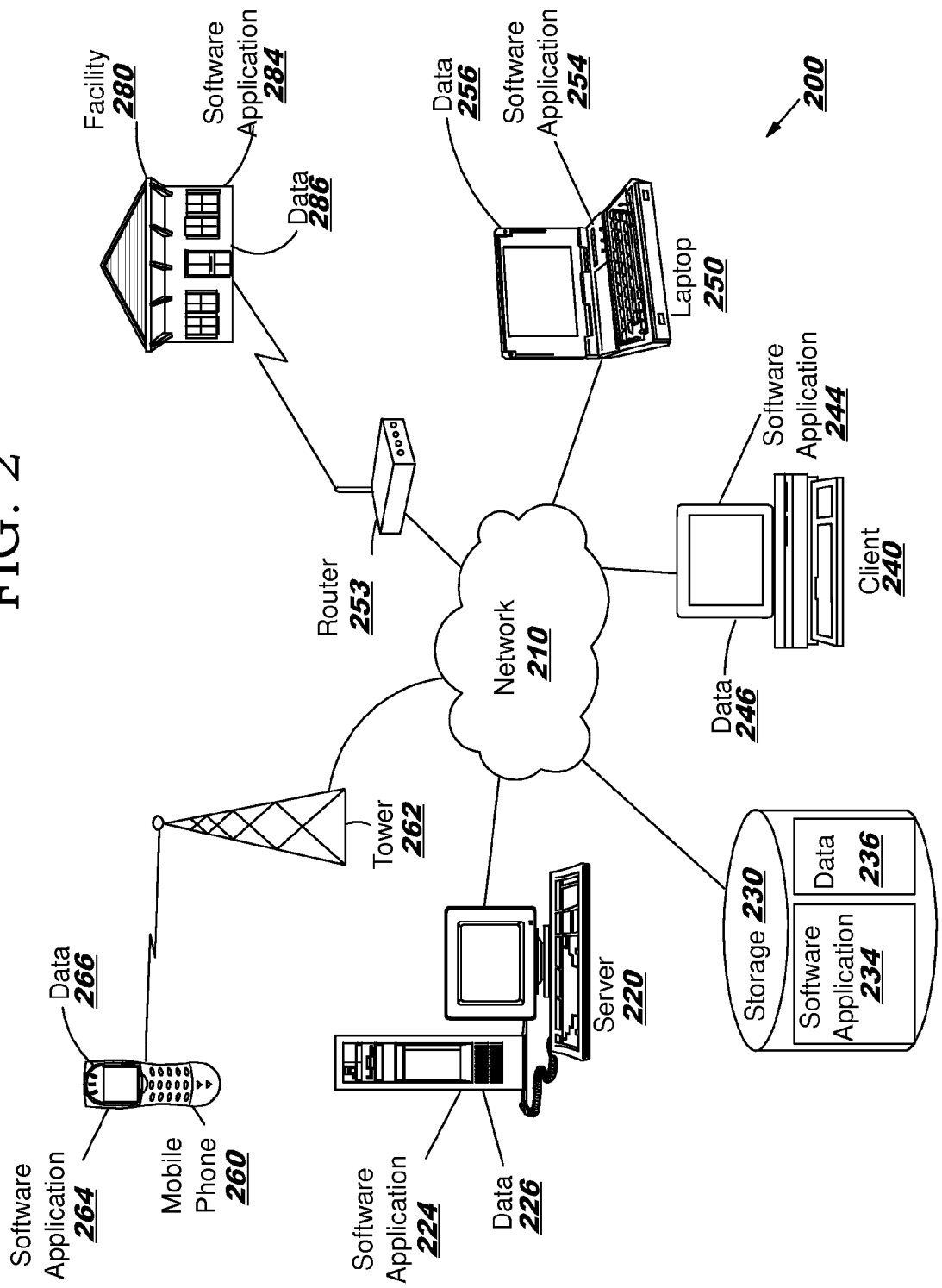
FIG. 2 is a block diagram of a network of data processing systems in which various embodiments may be implemented.

FIG. 2 is a block diagram of a network of data processing systems in which various embodiments may be implemented. Data processing environment 200 is a network of data processing systems such as described above with reference to FIG. 1. Software applications may execute on any computer or other type of data processing system in data processing environment 200. Data processing environment 200 includes network 210. Network 210 is the medium used to provide simplex, half duplex and/or full duplex communications links between various devices and computers connected together within data processing environment 200. Network 210 may include connections such as wire, wireless communication links, or fiber optic cables.

Server 220 and client 240 are coupled to network 210 along with storage unit 230. In addition, laptop 250 and facility 280 (such as a home or business) are coupled to network 210 including wirelessly such as through a network router 253. A mobile phone 260 may be coupled to network 210 through a mobile phone tower 262. Data processing systems, such as server 220, client 240, laptop 250, mobile phone 260 and facility 280 contain data and have software applications including software tools executing thereon. Other types of data processing systems such as personal digital assistants (PDAs), smartphones, tablets and netbooks may be coupled to network 210.

Server 220 may include software application 224 and data 226 for managing website registrations or other software applications and data in accordance with embodiments described herein. Storage 230 may contain software application 234 and a content source such as data 236 for managing website registrations. Other software and content may be stored on storage 230 for sharing among various computer or other data processing devices. Client 240 may include software application 244 and data 246. Laptop 250 and mobile phone 260 may also include software applications 254 and 264 and data 256 and 266. Facility 280 may include software applications 284 and data 286. Other types of data processing systems coupled to network 210 may also include software applications. Software applications could include a web browser, email, or other software application that can manage website registrations.

Server 220, storage unit 230, client 240, laptop 250, mobile phone 260, and facility 280 and other data processing devices may couple to network 210 using wired connections, wireless communication protocols, or other suitable data connectivity. Client 240 may be, for example, a personal computer or a network computer.

In the depicted example, server 220 may provide data, such as boot files, operating system images, and applications to client 240 and laptop 250. Server 220 may be a single computer system or a set of multiple computer systems working together to provide services in a client server environment. Client 240 and laptop 250 may be clients to server 220 in this example. Client 240, laptop 250, mobile phone 260 and facility 280 or some combination thereof, may include their own data, boot files, operating system images, and applications. Data processing environment 200 may include additional servers, clients, and other devices that are not shown.

In the depicted example, data processing environment 200 may be the Internet. Network 210 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 2 is intended as an example, and not as an architectural limitation for the different illustrative embodiments.

Among other uses, data processing environment 200 may be used for implementing a client server environment in which the embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

Figure 3:
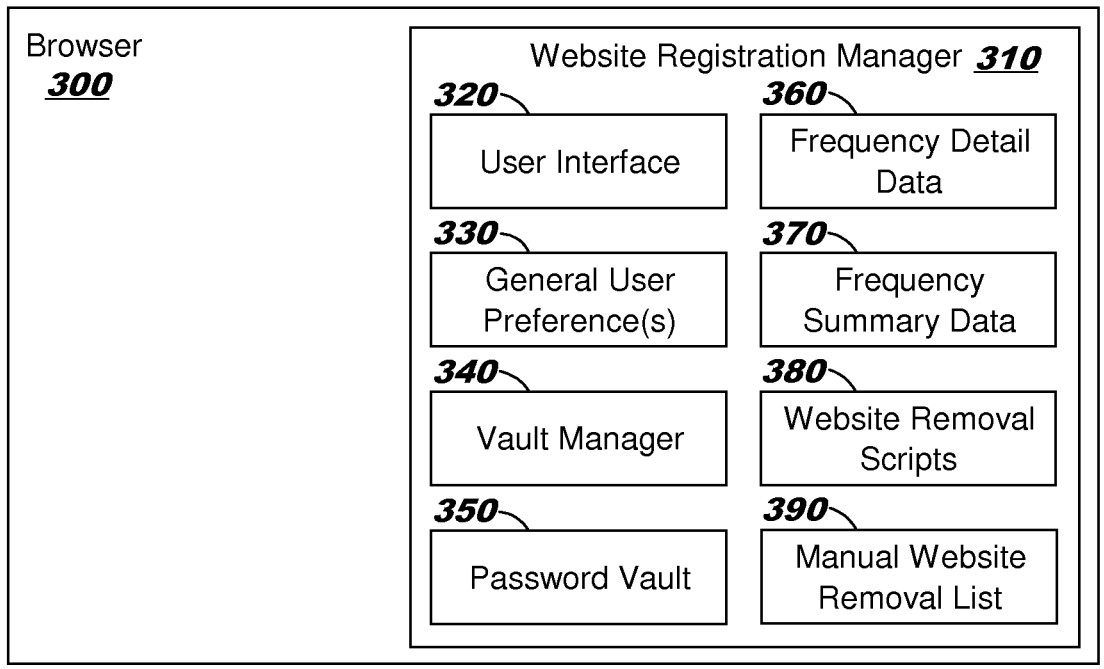
FIG. 3 is a block diagram of a browser incorporating a system for managing website registrations in accordance with a first embodiment.

FIG. 3 is a block diagram of a browser incorporating a system for managing website registrations in accordance with a first embodiment. A browser 300 includes a website registration manager 310. The website registration manager includes a user interface 320, a set of general user preferences 330, a vault manager 340, a password vault 350, a set of frequency summary data 360, a set of frequency detail data 370, a set of website removal scripts 380, and a manual website removal list 390.

The operations of the website registration manager 310 are primarily managed by the vault manager 340 in this embodiment. Alternative embodiments may utilize the user interface or other software to manage the overall processes of the website registration manager. Upon the user logging into a website (i.e. website account), the browser notifies the vault manager. This may be based on continuous inquiries from the vault manager with every browser user event (e.g. the user selects a new website, hits enter, or selects a link) or by programming within the browser. That is, this may be a push system where the browser informs the website registration system of a website login or it may be a pull system where the website operating system constantly queries the browser whether a website registration is occurring. In an alternative embodiment, the user may be able to press a function key to notify the website registration manager that the user is logging onto a website.

The browser can identify a user logging into a website based on the code being executed from each website. This identification may differ by type of browser and by website. For example, Firefox apparently detects passwords by form.elements[n].type="password" (iterating through all form elements) and then detects the username field by searching backwards through form elements for the text field immediately before the password field. Other browsers may use alternative techniques that may vary by website account.

If the website account is already known to the vault manager and stored in password vault 350, then updated activity is recorded in frequency detail data 370 and frequency summary data 360. If the website is new and not previously recorded in password vault 350, then the vault manager will create a new record in password vault 350 and then interact with the user through user interface 320 to obtain user preferences. If those preferences are general in nature, then general user preferences 330 is updated. If those preferences are specific to the website, then they are stored with a summary of website activity in frequency summary data 360. If a website registration is to be removed due to underutilization, various approaches may be utilized to remove that registration. If the website has a standard removal interface, then that interface may be used. If a website does not have a standard removal interface, then a script may be used to remove that website registration. A set of website removal scripts 380 for a variety of common websites may be stored locally in website registration manager 310. Website removal script 380 may be supplemented on-line with a set of scripts stored in a central repository such as in server storage 230. If a website registration to be removed cannot be removed automatically or using available scripts, then that website is identified in manual website removal list 390.

Figure 4:
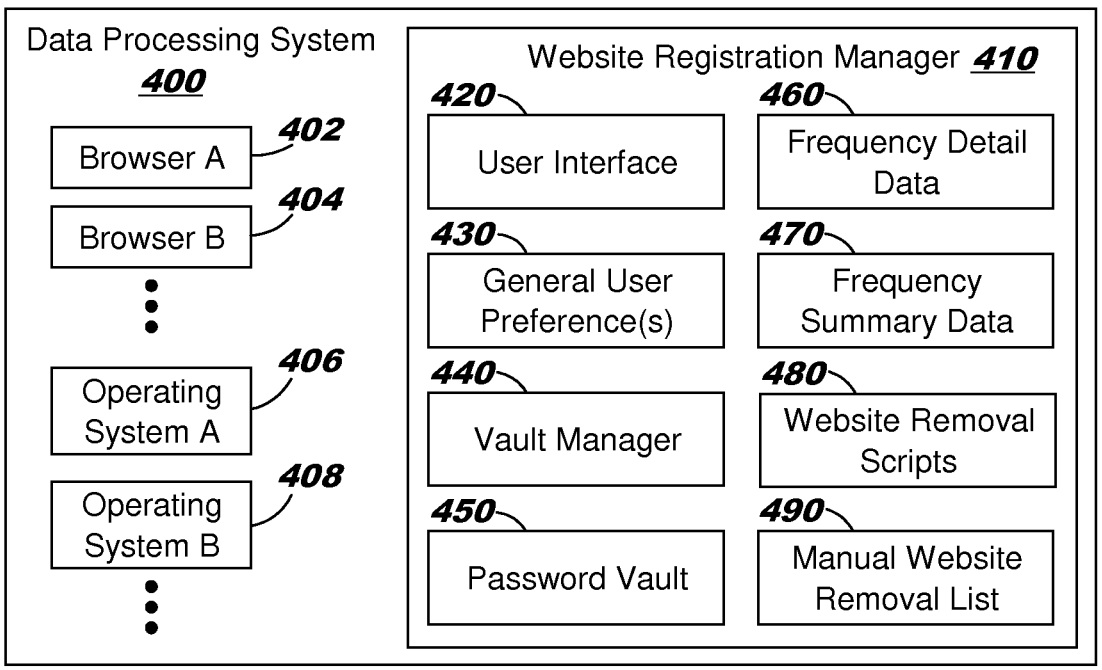
FIG. 4 is a block diagram of a data processing system incorporating a system for managing website registrations in accordance with a second embodiment.

FIG. 4 is a block diagram of a data processing system incorporating a system for managing website registrations in accordance with a second embodiment. A data processing system 400 includes browsers 402 and 404, operating systems 406 and 408, and a website registration manager 410. The website registration manager includes a user interface 420, a set of general user preferences 430, a vault manager 440, a password vault 450, a set of frequency summary data 460, a set of frequency detail data 470, a set of website removal scripts 480, and a manual website removal list 490.

The operations of the website registration manager 410 are primarily managed by the vault manager 440 in this embodiment. Alternative embodiments may utilize the user interface or other software to manage the overall processes of the website registration manager. Upon the user logging into a website account in a browser, either that browser or the operating supporting that browser notifies the vault manager. This may be based on continuous inquiries from the vault manager with every browser user event (e.g. the user selects a new website, hits enter, or selects a link) or by programming within the browser or operating system. That is, this may be a push system where the browser or operating system informs the website registration system of a website login or it may be a pull system where the website operating system constantly queries the browser or operating system whether a website registration is occurring. In an alternative embodiment, the user may press a function key or perform some similar action to notify the website registration manager that the user is logging onto a website.

A browser can identify a user logging into a website based on the code being executed from each website. This identification may differ by type of browser or operating system and by website. For example, Firefox apparently detects passwords by form.elements[n].type="password" (iterating through all form elements) and then detects the username field by searching backwards through form elements for the text field immediately before the password field. Other browsers or operating systems may use alternative techniques that may vary by website.

An advantage of this embodiment is that the website registration manager can easily track website access utilization regardless of the browser or operating system used by the user. This embodiment could be extended to a cloud environment where website account utilization regardless of the system the user is accessing. In an alternative embodiment, the website registration manager may be embedded or integrated in a single operating system, which allows for website account utilization to be tracked across multiple browsers so long as the browser is being accessed with the same operating system.

In an alternative embodiment, the data processing system may be a server in a multi-user environment such as a business enterprise, a home, or on the cloud. In such cases, an individual website registration manager may be used for each user, or one website registration manager may be used with an individual password vault for each user, or other types of configurations. The type of configuration used may be based on security issues such as whether the users all reside behind a common firewall. However, each person may have their own preferences, possibly within certain enterprise constraints, and their own website registration identification and tracking. To manage such a configuration, each user may have a unique user identifier.

If the website is already known to the vault manager and stored in password vault 450, then updated activity is recorded in frequency detail data 470 and frequency summary data 460. If the website is new and not previously recorded in password vault 450, then the vault manager will create a new record in password vault 450 and then interact with the user through user interface 420 to obtain user preferences. If those preferences are general in nature, then general user preferences 430 is updated. If those preferences are specific to the website, then they are stored with a summary of website account activity in frequency summary data 460. If a website registration is to be removed due to underutilization, various approaches may be utilized to remove that registration. If the website has a standard removal interface, then that interface may be used. If a website does not have a standard removal interface, then a script may be used to remove that website registration. A set of website removal scripts 480 for a variety of common websites may be stored locally in website registration manager 410. Website removal script 480 may be supplemented on-line with a set of scripts stored in a central repository such as in server storage 230. If a website registration to be removed cannot be removed automatically or using available scripts, then that website is identified in manual website removal list 490.

FIGS. 5A through 5E are block diagrams illustrating types of data stored in website registration manager in which various embodiments may be implemented. This includes block diagrams illustrating types of data stored in a password vault 500, a frequency detail 530, a frequency summary 560, website removal script(s) 580, and a manual website removal list 590. Each of these sets of data includes multiple records, each record identifying one website. These sets of data are generally cross referenced with each other by use of a unique identifier (unique ID) generated for each website registration by the vault manager. Website removal script(s) 580 are a set of scripts previously stored in the website registration manager and may not be correlated to a specific website registration with a unique ID. Alternative embodiments may use alternative approaches in organizing this type of information.

Figure 5A:
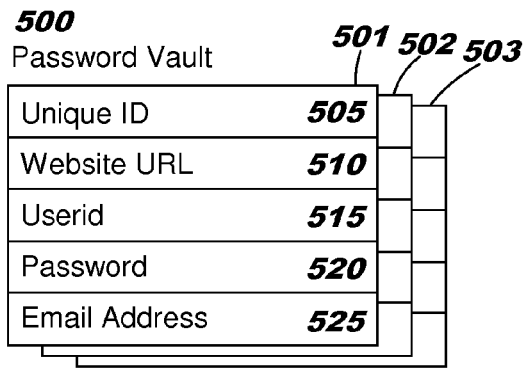
FIGS. 5A through 5E are block diagrams illustrating types of data stored in website registration manager in which various embodiments may be implemented.

The password vault of FIG. 5A may be encrypted for security purposes by the vault manager to protect the passwords stored therein. Password vault 500 includes multiple records 501, 502 and 503 although additional records may be stored, each record for storing information related to one website registration. Each record includes a unique ID 505 generated by the vault manager for each website registration. This unique identifier is used to cross reference with the other records within the website registration manager. A website URL 510 which is used to access the website account is included to help identify whether the user is logging into a new website account or a previously identified and stored website account. The userid 515, password 520 and email address 525 are used for accessing the website account and are stored for access by the user as needed and may be provided automatically by the website registration manager when the user attempts to log into the website account.

Figure 5B:
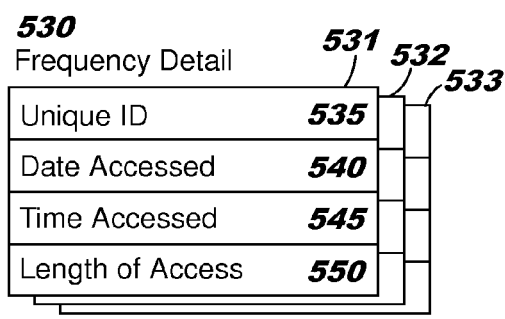

The frequency detail of FIG. 5B is used to maintain a list of website account accesses by the user. Frequency detail 530 includes multiple records 531, 532 and 533, although additional records may be stored. Frequency detail 530 includes one record for each time the user visits a website account, although alternative embodiments may store data differently. Upon each access, the unique ID 535 for that website address is stored in frequency detail 530 with the date accessed 540, the time accessed 545 and the length of the visit 550. Additional data may be stored as well depending on the type of preferences that the website registration manager may allow the user to select and the type of information that the system may track for other purposes. This information may be retained forever or for a period of time specified by default settings or by the user. This information may be useful for statistical analysis of website utilization for implementing user preferences for removing website registrations based on underutilization of those website accounts in accordance with a policy.

Figure 5C:
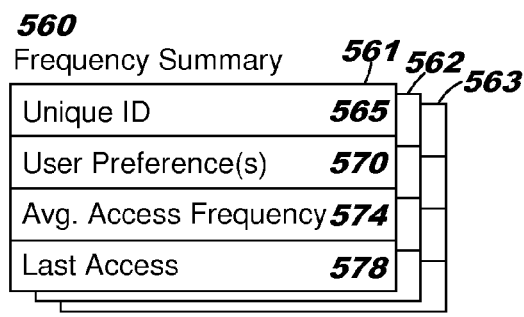

The frequency summary of FIG. 5C is used to maintain a summary of website account accesses by the user. Frequency summary 560 includes multiple records 561, 562 and 563 although additional records may be stored. Frequency summary 560 includes one record for each website account although alternative embodiments may store such data differently. The unique ID 565 is stored with any user preference(s) 570 that the user may specify for the website account identified by the unique ID. It may also include any defaults which may have been set for the website registration manager prior to any user preferences. The application of user preferences and/or defaults to removing a website registration due to underutilization is referred to herein as a policy. The user preferences can include whether the website account information should be maintained forever, until it has not been accessed for a certain number of days or months, until it has been access less than a threshold frequency, etc. The frequency may be weighted based on the length of time the user spends accessing the website. The application of user preferences (and/or defaults) to removing a website registration due to underutilization is referred to herein as a policy. Also stored in the frequency summary are an average frequency of accesses 574 and a date of the last access 578 to the website account. Alternative embodiments may store additional or different data for determining whether user preferences have been met for inactivating an account due to underutilization.

Figure 5D:
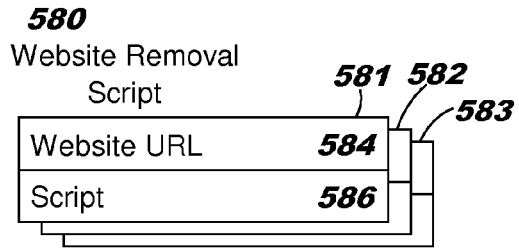

The website removal script(s) of FIG. 5D are used to store a set of scripts from removing website registration from a variety of commonly used websites. Website Removal script(s) 580 includes multiple records 581, 582 and 583 although additional records may be stored, each record for storing information related to one website registration removal script. Each record includes a website URL 584 and a script 586 suitable for removing the website registration for the website URL. This may be supplemented with other scripts stored remotely or across the internet to be accessed as needed.

Figure 5E:
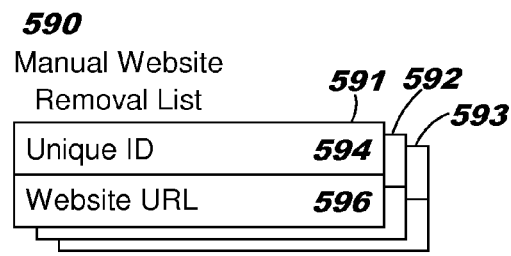

The manual website removal list of FIG. 5E is used to maintain a list of website accounts that need to be inactivated, but which cannot be inactivated automatically by the vault manager. Manual website removal list 590 includes multiple records 591, 592 and 593 although additional records may be stored, each record for storing information related to one website registration to be removed manually. Each record includes a unique ID 594 and the corresponding website URL 596. This may be provided to the user periodically for the user to manually inactivate these website accounts.

In a multiuser environment, some or each of these sets of data may include a user identifier for determining which data applies to which user, thereby allowing for individualization of preferences, identification and tracking within the system.

Figure 6:
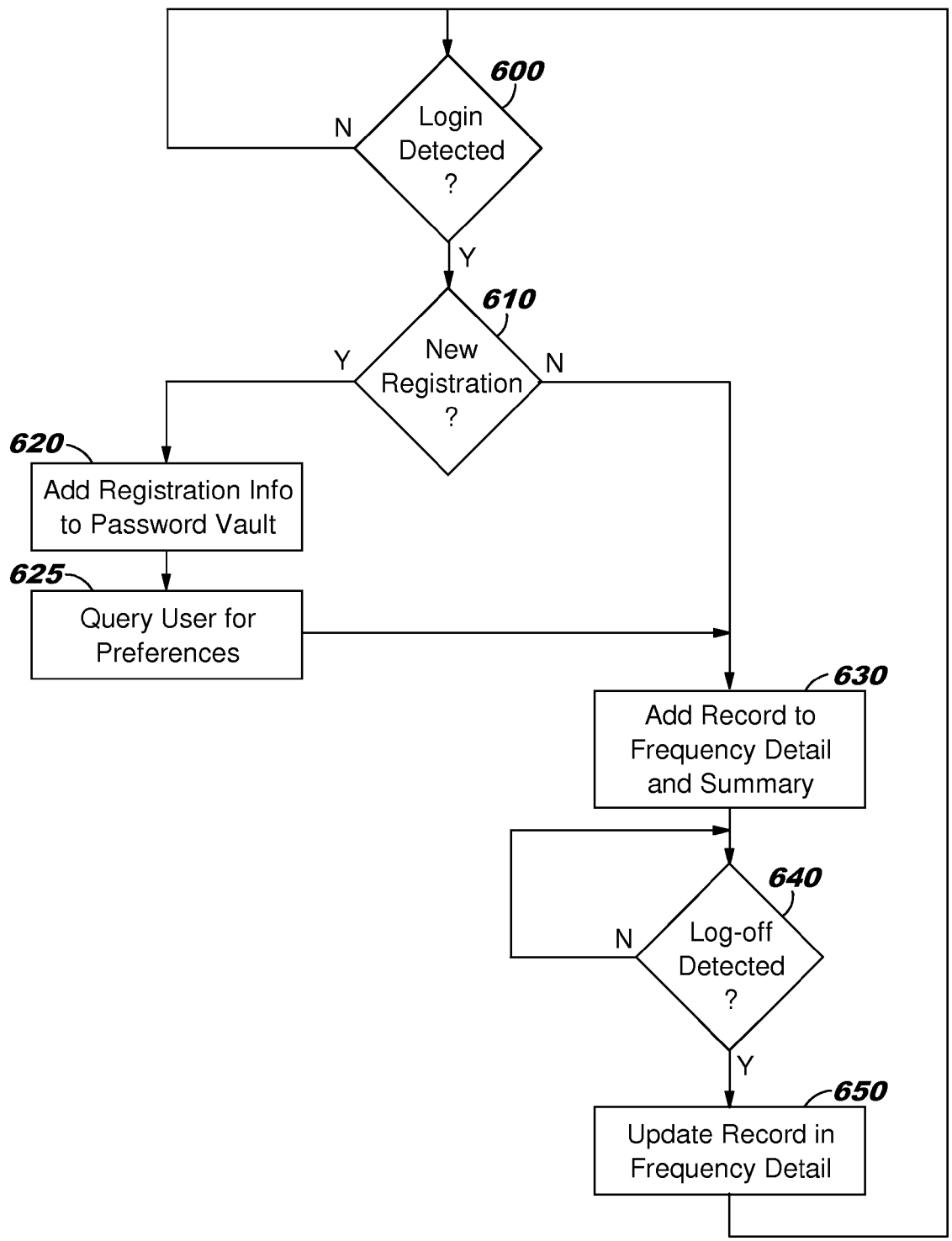
FIG. 6 is a flow diagram of the website registration manager monitoring website registrations and utilization in which various embodiments may be implemented.

FIG. 6 is a flow diagram of the website registration manager monitoring website registrations and utilization in which various embodiments may be implemented. This process may be performed primarily by the vault manager which then utilizes the user interface to interact with the user as needed. It is the data collected and stored by this process which is used to remove website registration in accordance with policies.

In a first step 600, it is determined whether a login or registration to a website account has been detected. As described above with reference to each embodiment, this may be a push system where the browser or operating system informs the website registration system of a website login or it may be a pull system where the website operating system constantly queries the browser or operating system whether a website registration is occurring. A browser or operating system can typically detect a website login or new registration based on the programming of the website being accessed. In an alternative embodiment, a user may press a function key or perform some similar action to notify the website registration manager that the user is logging onto a website. If no in step 600, then processing returns to step 600 which is performed repeatedly until a website registration or login has occurred. Otherwise, processing continues to step 610.

In step 610, it is determined whether this is a new registration or a login to a previously known website. A new registration may be where the user is creating a new account or it may be where the user is accessing a website account which is unknown to the website registration manager. That is, the user may have previously registered with a website prior to the implementation of the website registration manager or the user may have registered with a website on another system, operating system or browser that the website registration manager does not have access to for tracking purposes. This can easily be determined by checking the password vault to determine whether this website URL or a similar website URL with a common root is stored in that vault. If it is a new registration, the processing continues to step 620, otherwise processing continues to step 630.

In step 620, the registration information provided by the user to create or access the account is added to the password vault including a unique ID generated by the vault manager, the website URL, the userid, the password, and the email address. Processing then continues to step 625 where the user is queried through the user interface for a policy based on user preferences with regards to inactivating the account if it is underutilized. For example, the user may specify that the website account be inactivated for underutilization if it is not accessed for a period of weeks, months or years. This may be particularly useful if the user is registering at a website for a one time purpose such as purchasing an item. For another example, the user may specify that the website account be inactivated for underutilization if the user accesses the account less than twice a year. The frequency may be weighted based on the length of time the user spends accessing the website. The user may also be queried whether to modify general preferences which may have been set earlier by the user or by the software provider of the browser, operating system or website registration manager as default settings. The user may set the general settings and then specify that the general settings should be utilized as the policy for all website registration without querying the user. Processing then continues to step 630.

In step 630, a record is added to the frequency detail database with the unique ID of the website and the date and time of the website access. The length of time accessing the website cannot be determined yet, but will be determined later in this process. Additional data may be preserved for statistical analysis of website utilization to determine whether the website registration should be inactivated based on policies. This information is also summarized in the frequency summary database. If this is a new registration, then a new record is added to that database. The frequency summary records are later utilized by the website registration manager for determining which website registrations to inactivate.

Subsequently in step 640, it is determined whether the user has logged off the website such as by logging off explicitly, by browsing to a new website, or by closing the browser. If not, then processing returns to step 640 which is repeated until the user has logged off the website. Once the user has logged off from the website, in step 650 the frequency detail record is updated with the length of time the website was accessed. The frequency summary database may also be updated depending on the type of information stored there. Processing then returns to step 600.

Figure 7:
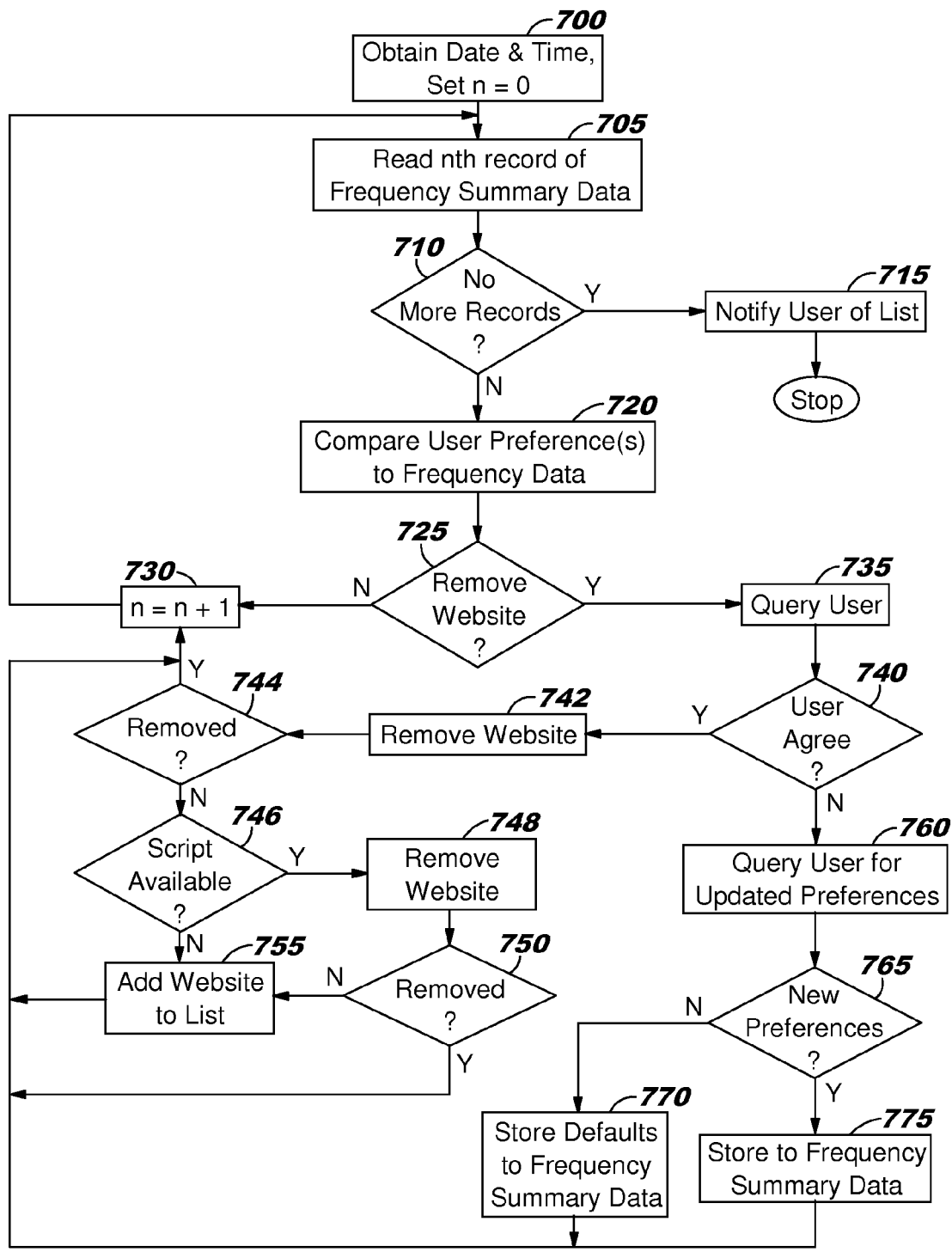
FIG. 7 is a flow diagram of the website registration manager removing website registrations in which various embodiments may be implemented.

FIG. 7 is a flow diagram of the website registration manager removing website registrations in which various embodiments may be implemented. This process may be performed primarily by the vault manager which then utilizes the user interface to interact with the user as needed. It is the data collected and stored by the process described with reference to FIG. 6 that is used to remove website registration in accordance with policies. This process may be initiated each time the user accesses a browser, turns on the data processing system, or periodically such as once a week. This frequency of performing this process may be based on user preferences or default settings.

In a first step 700, the current date and time is obtained and n is set equal to zero. Subsequently in step 705 the nth record of the frequency summary database is accessed. In step 710, it is determined whether there are no more records to be accessed in the frequency summary database. That is, no nth record was accessed in step 705. If not, then processing continues to step 715 where the user is reminded of the list of website registrations to be manually removed such as by inactivating the registration of the website account. These are website registrations that cannot be automatically removed or inactivated by this process. Alternatively, all website registrations may be shown including those set for manual removal such as described below with reference to FIG. 8. If the user does select a website registration from removal, then n could be set to set back to 0 or to the website registration selected for removal and processing continue to step 720.

If an nth record of the frequency summary is accessed, then in step 720 the policies set by the user preferences are compared to the data in the frequency summary database. If needed based on user preferences. The frequency detail database can also be accessed to perform statistical analysis if needed according to the policy for that website. Processing then continues to step 725.

In step 725, it is determined whether the website registration should be inactivated due to underutilization in accordance with the policy or due to user selection such as described below with reference to FIG. 8. If not, then in step 730 n is incremented by 1 and processing returns to step 705. If yes, the in step 735 the user may be queried to verify that the user agrees with removing the account. This may include erasing or deleting a record of the registration within the website registration manager. In an alternative embodiment, the website may be automatically removed without notifying the user, without querying the user or approval, or both. The user may include this as a user preference, either in general or for one or more website registration. Processing continues to step 740 where it is determined whether the user agrees with inactivating the account. If yes, then in step 742 the system attempts to remove the website registration automatically. Some websites may be designed to allow for straightforward inactivation which may be performed automatically. Subsequently in step 744 it is determined whether the website was removed automatically. If yes, then processing continues to step 730. If not, then in step 746 it is determined whether a script is available, either locally or remotely, for removing a website registration for that website. If yes, then in step 748 that script is used to remove that website registration. In step 750 it is determined whether that script was successful. If yes, then processing returns to step 730. If not in step 746 or step 750, then in step 755 that website is added to the list of websites to be manually removed and processing returns to step 730. Otherwise, processing returns to step 730 directly.

If the user does not agree to remove the website in step 740, then in step 760 the user is queried for updated preferences with regards to inactivating that website registration. It is then determined in step 765 whether the user provides some new preferences, thereby updating the policy for that website account. If new user preferences are provided, then those preferences are stored to the frequency summary database in step 775 and processing returns to step 730. If no new user preferences are provided, then in step 770 a default policy may be stored to the frequency summary data for that website. This would help prevent the user from being queried every time this process is run for inactivating the same website registration. The default may be as simple as providing a one month extension for that website registration. Other defaults may be used including those specified by the user. Otherwise the user will receive periodic alerts that the website registration is recommended for removal. Processing then returns to step 730.

FIG. 8 is a diagram of a graphical user interface (GUI) for removing website registrations. This GUI 800 may be generated in response to a user request or it may be generated automatically whenever the website removal manager determines one or more website registrations should be removed in accordance with policies set forth by default or by user preferences. GUI 800 may be used in conjunction with the process described above with reference to FIG. 7.

GUI 800 may include a list of website registrations recommended for removal 810 in accordance with policies set forth by default or by user preferences. GUI 800 may also include a list of website registrations not recommended for removal 820, but may allow the user to select such website registrations for removal. Each website 840 listed may be a hotlink allowing the user to mouse click that link to open a new window with the selected website shown in that window. This would allow the user to identify the website further should the user not recognize that website. Each website 840 listed includes a box 830 for identifying which website registrations should be removed. In the case of the websites recommended for removal, boxes 830 are already checked by the system. The user can then deselect those websites by mouse clicking on those boxes. The user can also select other website registrations for removal by clicking on boxes not currently selected. The time each website was last accessed or visited by the user is shown in column 850. The frequency of visits for each website is also shown in column 860. In this case, this is the number of visits to that website in the past year. Alternative embodiments may use other frequency measurements such as a color indicator where green is frequent, yellow is less frequent, and red in very infrequent. The user may scroll through a multitude of websites using scroll bar 870.

When the user has finished his or her selection of website registrations for removal, the user may then click on remove button 880. This would initiate a removal process such as described above with reference to FIG. 7 above. However, in that process, the user would not need to be queried again such as described in step 735 above because the user has already indicated his or her desire to remove or not remove that website registration.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), or Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code such as for managing website registrations. A client data processing system may download that computer usable code, such as for storing on a data storage medium associated with the client data processing system, or for using in the client data processing system. The server data processing system may similarly upload computer usable code from the client data processing system such as a content source. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for removing underutilized website account registrations in accordance with a policy provided by a user comprising:
   identifying a registration of a website account on a website system across a network by the user on a data processing system;
   querying the user for the policy, including a set of user preferences, for inactivating the website account due to underutilization by the user;
   tracking access by the data processing system to the website account by the user;
   responsive to determining underutilization of the website account in accordance with the policy, removing the registration of the website account from the website system across the network.

2. The method of claim 1 wherein the policy is based on one or more items selected from a list of default values and the set of user preferences.

3. The method of claim 2 wherein the set of user preferences includes one or more items selected from the group of time since last access, frequency of access, and weighted frequency of access based on time of access.

4. The method of claim 2 wherein the policy may vary by website account.

5. The method of claim 2 wherein the policy may be initially set to default values that may be altered by the user with the set of user preferences that may vary by website account.

6. The method of claim 1 wherein a password vault is utilized for tracking the website account and associating the password vault with at least one unique email address.

7. The method of claim 2 wherein the policy is selected from a group consisting of automatically removing the website account and requiring approval from the user to remove the registration of the website account.

8. The method of claim 1 further comprising:
   providing a user interface (UI) for adjusting the policy;
   querying the user for a notification user preference for notifying the user before removing the website account due to underutilization; and
   querying the user for an approval user preference regarding receiving approval from the user before removing the website account due to underutilization.

9. A computer usable program product comprising a non-transitory computer usable storage medium including computer usable code for use in removing underutilized website account registrations in accordance with a policy provided by a user, the computer usable program product comprising code for performing the steps of:
   identifying a registration of a website account on a website system across a network by the user on a data processing system;
   querying the user for the policy, including a set of user preferences, for inactivating the website account due to underutilization by the user;
   tracking access by the data processing system to the website account by the user;

responsive to determining underutilization of the website account in accordance with the policy, removing the registration of the website account from the website system across the network.

10. The computer usable program product of claim 9 wherein the policy is based on one or more items selected from a list of default values and the set of user preferences.

11. The computer usable program product of claim 10 wherein the set of user preferences includes one or more items selected from the group of time since last access, frequency of access, and weighted frequency of access based on time of access.

12. The computer usable program product of claim 10 wherein the policy may vary by website account.

13. The computer usable program product of claim 10 wherein the policy may be initially set to default values that may be altered by the user with the set of user preferences that may vary by website account.

14. The computer usable program product of claim 10 wherein the policy is selected from a group consisting of automatically removing the registration of the website account and requiring approval from the user to remove the registration of the website account.

15. A data processing system for removing underutilized website account registrations in accordance with a policy provided by a user, the data processing system comprising:
   a processor; and
   a memory storing program instructions which when executed by the processor execute the steps of:
   identifying a registration of a website account on a website system across a network by the user on the data processing system;
   querying the user for the policy, including a set of user preferences, for inactivating the website account due to underutilization by the user;
   tracking access by the data processing system to the website account by the user;
   responsive to determining underutilization of the website account in accordance with the policy, removing the registration of the website account from the website system across the network.

16. The data processing system of claim 15 wherein the policy is based on one or more items selected from a list of default values and the set of user preferences.

17. The data processing system of claim 16 wherein the set of user preferences includes one or more items selected from the group of time since last access, frequency of access, and weighted frequency of access based on time of access.

18. The data processing system of claim 16 wherein the policy may vary by website account.

19. The data processing system of claim 16 wherein the policy may be initially set to default values that may be altered by the user with the set of user preferences that may vary by website account.

20. The data processing system of claim 16 wherein the policy is selected from a group consisting of automatically removing the registration of the website account and requiring approval from the user to remove the registration of the website account.

* * * * *